April 28, 1959          M. O. SEM          2,883,708

MANUFACTURE OF CARBON BLOCKS FOR USE AS ELECTRODES

Filed March 9, 1955          2 Sheets-Sheet 1

INVENTOR
Mathias Ovrom Sem
BY
Eyre, Mann & Burrows
ATTORNEYS

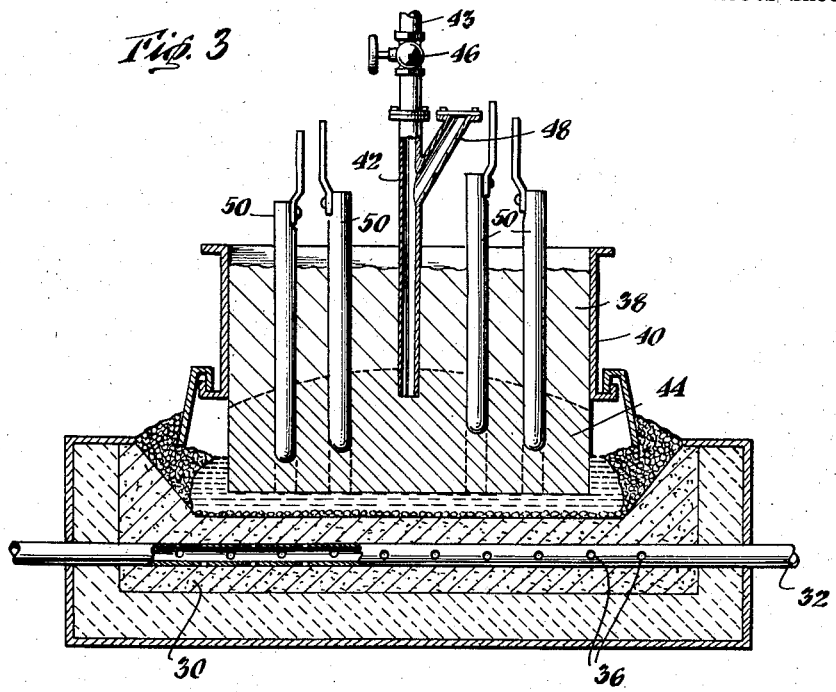
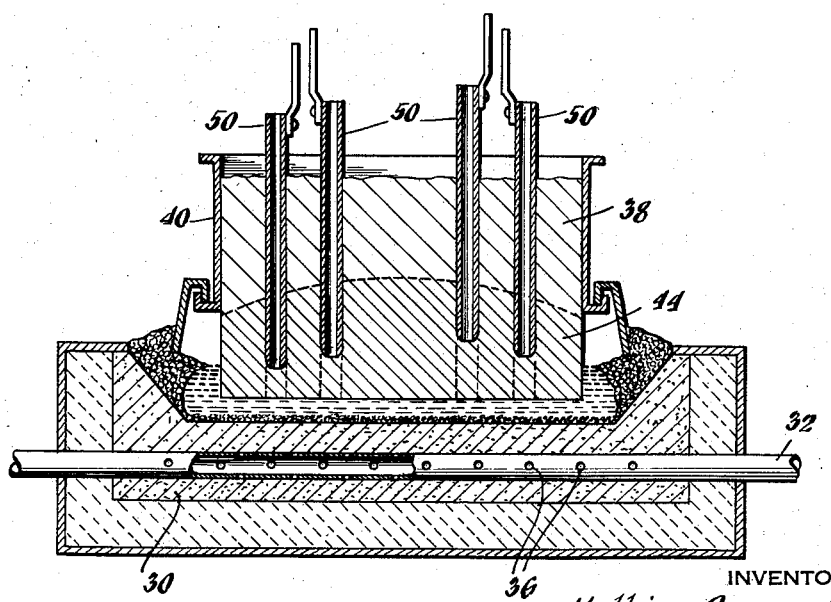

United States Patent Office 2,883,708
Patented Apr. 28, 1959

2,883,708

MANUFACTURE OF CARBON BLOCKS FOR USE AS ELECTRODES

Mathias Ovrom Sem, Smestad, Oslo, Norway, assignor to Elektrokemisk A/S, Oslo, Norway, a corporation of Norway Application March 9, 1955, Serial No. 493,270

6 Claims. (Cl. 18—54.7)

In the manufacture of molded bodies of carbon such as are used for electrodes, it is customary to use calcined petroleum coke, anthracite or the like which is ground to defined grain sizes and mixed with a bituminous binding agent as, for example, tar or pitch. The electrode paste is given the desired shape, for example by pressing or casting, and is baked at a temperature high enough so that the volatile constituents of the binder will be driven off. The weight of the mass will in this way usually be reduced from 8% to about 16%. This means that the resulting carbon body will be porous and in practice the porosity will amount to between 15% and 30%.

In accordance with the present invention the porosity of such bodies is reduced and the electrical and mechanical qualities of the electrodes are greatly improved by forcing a gas containing hydrocarbon through the body at a temperature high enough so that the hydrocarbon gas will undergo pyrogenic decomposition resulting in a precipitation of carbon on and within the carbon body.

The temperature at which the decomposition will take place will vary somewhat with the actual gas employed. With propane, substantially no decomposition takes place below approximately 600° C. whereas at 1000° C. the propane is virtually entirely decomposed and the residual gas is substantially pure hydrogen. In any event temperatures above 600° C. must be used.

An economic and efficient type of gas to be used for carrying out my process is to employ the tar fumes driven out of the mass when it is being baked or first solidified. Such fumes ordinarily consist of compounds of a higher molecular weight than propane and will be decomposed more easily.

Various methods of carrying out my invention are illustrated in the accompanying drawings, in which Fig. 1 is a sectional side view of an apparatus for impregnating blocks of formed carbonaceous material;

Fig. 3 is a sectional view of an aluminum furnace showing the manner in which a continuous type electrode may be impregnated as it is being used and formed, and Fig. 4 is a view similar to Fig. 3 showing an alternative method of impregnating the electrode of an aluminum furnace.

Figure 1:
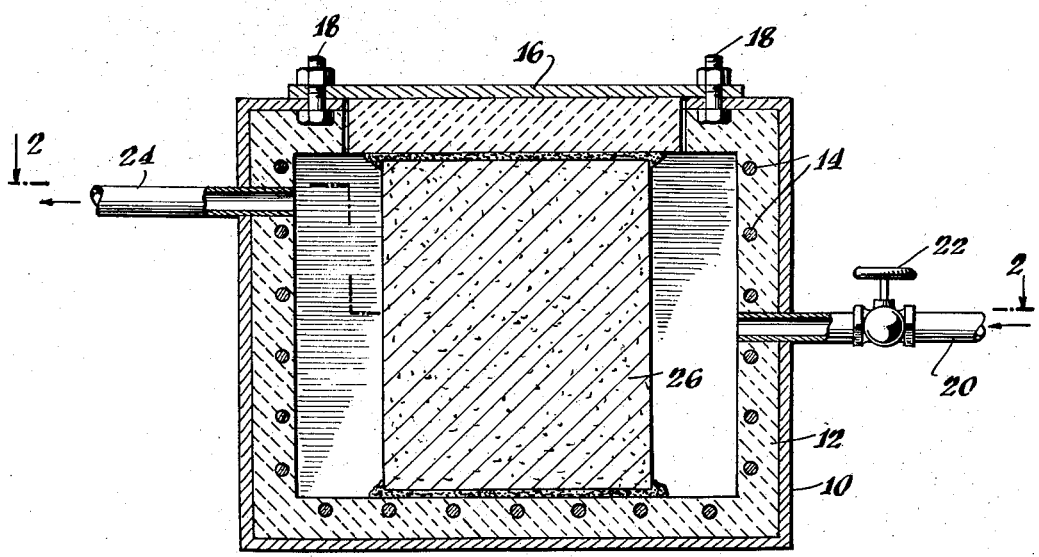
Figure 2:
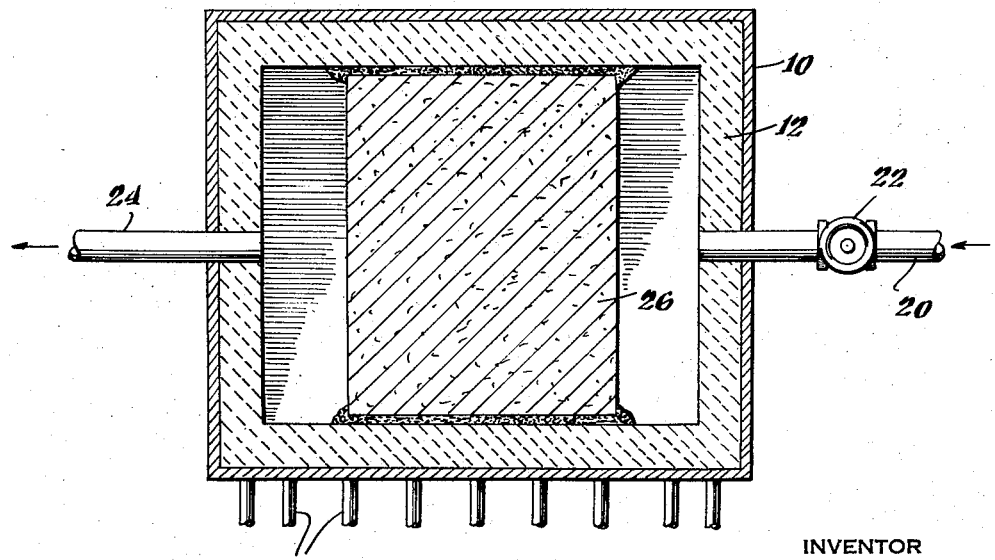
Fig. 2 is a sectional plan view of the structure shown in Fig. 1.

Referring to Figs. 1 and 2, 10 represents the shell of a chamber lined with insulating material 12 and provided with heating means 14 which may be in the form of resistance bars. The device is provided with an insulated cover 16 adapted to be bolted down tight to the shell 10 as indicated at 18. A pipe 20 provided with a valve 22 is used to admit hydrocarbon gas under pressure into the chamber and a corresponding pipe 24 is used for withdrawing the residual gas which will be largely hydrogen.

A block 26 is cut so that it will exactly fit between the side walls of the chamber but will leave spaces at the ends of pipes 20 and 24 as shown in the drawings. The block is positioned in the chamber and sealed against both side walls and the bottom of the chamber, using any desired type of sealing material. Additional sealing material is placed on the top of the block and the cover 16 is then screwed down. In this way the block of carbonaceous material forms a solid member which may be considered as a thick diaphragm in the chamber. Hydrocarbon gas is admitted through the pipe 20 under sufficient pressure to force it through the block 26, and the residual gas is withdrawn through the pipe 24.

If the temperature on both sides of the block 26 is kept the same, the principal deposition of carbon will be at the side where the hydrocarbon gas is introduced. However, by maintaining a higher temperature on the exit side than on the entrance side the deposition of the carbon in the block can be rendered substantially uniform. For example, the temperature on the side where the pipe 20 enters the chamber may be between 650° C. and 750° C. and the temperature on the other side of the chamber should preferably exceed 900° C. and may range up to as much as 1000° C. or even more. The time necessary thoroughly to impregnate the block will depend upon the size of the block, the temperatures employed and the amount of gas which is forced through the block, that is, the pressure upon the gas as it passes in through the pipe 20. Experience will show the operator the extent and time to which the block should be subjected to the gas treatment. Usually this can be judged by the fact that the passage of gas through the block is slowed down to such an extent that further treatment is no longer efficient. As previously stated, at the temperature given the hydrogen gas will be virtually all decomposed within the mass and the gas withdrawn will be principally hydrogen.

After the impregnation has been completed, the block should be cooled slowly to prevent cracking and ignition on exposure to air. After it is finally cooled and removed from the chamber, the block may be cut into any desired shape.

In addition to the use of this impregnated block of carbon for the manufacture of usual prebaked electrodes, applicant has found that the dense carbon mass produced in accordance with this invention is particularly useful for the formation of electrically conductive carbon bottoms for smelting furnaces. In many cases carbon is an excellent material for bottoms in electrical and other smelting furnaces but in ordinary case the life of such bottoms will be relatively short, as the pores will gradually be filled with slag or molten material from the bath and the efficiency of the carbon member will thus be slowly destroyed. This is especially important in connection with a furnace for the electrolytic production of aluminum. It is well recognized that in aluminum furnaces the carbon bottoms have to be renewed from time to time, their life in practice varying between one and five years. Changing these bottoms is an expensive operation demanding the shut-down of the furnace and also great quantities of valuable fluoride material from the bath will fill the pores of the carbon bottom and either be lost or involve heavy additional expense of recovery.

In aluminum furnaces it is very important to keep the voltage drop in the furnace bottom as low as possible. By employing a compact carbon material according to this invention the voltage drop will be reduced.

Such furnace bottoms may be formed in the manner already described or the cathode bars which pass through the carbon bottoms may be used as a means for introducing the hydrocarbon gas into the mass.

In Figs. 3 and 4 the carbon bottom of the furnace is indicated at 30 and in this case the cathode bars 32 which pass through the carbon bottom are made hollow and are provided with perforations as shown at 36. During the final baking of the carbon bottom with such cathode bars in place, the hydrocarbon gas is introduced through the cathode bars and emerges through the perforations 36 into the carbon mass. Such furnace bottoms are usually baked by heat from above. This means that the principal decomposition of the hydrocarbon gas will take place at the top of the carbon masses so that the surface adjacent the bath will be dense and substantially impermeable.

This invention may be used not only for impregnating the bottom or cathode element of the furnace but also may be used to impregnate the anode which is here of the continuous type and is indicated at 38. This anode is formed by introducing carbonaceous material and binder into the shell 40 and gradually as the anode is consumed and moves downwardly the volatile materials will be driven out of the tar binders and the electrode will be hardened and carbonized.

In Fig. 3 a tube 42 is shown as passing down into the anode mass, with its lower end extending into the portion of the anode which has been substantially solidified as indicated at 44. Hydrocarbon gas, such as the gas collected from the tar vapors may be forced down through the tube 42 in which case it will permeate through the hardened block and carbon will be deposited to solidify the mass. The temperature of an aluminum furnace is about 900° C. and this is high enough to cause a substantial amount of cracking to take place. In this way an increase of the density of the electrode is attained and its electrical and mechanical qualities will be improved, which is of great importance to the economy of the process.

In this example the gas is supplied to the tube 42 by pipe 44 and the flow of gas is controlled by the valve 46. As the electrode is consumed, the tip of the tube will gradually reach such a low position that it has to be raised. When it has been raised to its new position, the empty space which thus is formed in the electrode below the tip of the tube may be filled preferably with easy-flowing tar. Such tar may be introduced by breaking the connection between the pipe 44 and the tube 42 or the tube 42 may be provided with a branch 48 through which the tar may be introduced as required. The tar will coke more readily below the tip of the tube. As the electrode is not subjected to any strains in the central area where the tube is located, such coke will not represent any weakening of importance to the electrode.

Another form of using the invention is shown in Fig. 4. In this case the studs 50 which transmit the electrical energy to the electrode and by which it is supported are made hollow so that gas may be introduced directly through the contact studs. The hole in the electrode which is formed by the raising of the stud may be filled with tar in the same manner as described above. It is to be understood that the studs may be raised by loosening them and pulling them up directly, or they may be formed with threaded outside surfaces as illustrated in United States Patent No. 2,100,927. In such case the studs may be raised in the mass by rotation.

This introduction of hydrocarbon gas into the mass through the electrodes permits a continuous operation without withdrawing the electrodes. One of the problems that ordinarily exists is that the carbonaceous mass contains substantial percentages (from .5% to 2%) of sulphur. This sulphur tends to react with the tips of the contact studs and demands that they be cleaned periodically. Eventually the studs are corroded away so that their ends come down to a substantial point instead of remaining in cylindrical shape. These disadvantages are practically totally avoided by introduction of a suitable quantity of hydrocarbon gas into the anode with an excess pressure being maintained at the lower ends of the contact members. The hydrocarbon gas thus introduced builds up such a pressure that the sulphur vapors have very little opportunity to contact the tips of the contact studs so that corrosion is greatly reduced and the deposition of the carbon directly around the contact studs tends to increase the electrical conductivity and reduce the voltage drop. While I mention that tar vapors may be used for introduction into the carbon mass, it is obvious that other forms of hydrocarbon gases may be employed. Thus in areas where natural gas is available, this will serve excellently for my purpose.

What I claim is:

1. The method of producing molded bodies adapted for use as electrodes and the like which comprises mixing particles of carbonaceous material with a tar-like binder adapted to be solidified with heat, forming a mass of such material into a desired shape, heating such mass to drive off volatile ingredients from the binder and to harden the mass, and then forcing a hydrocarbon gas into and through the mass of solidified material which is heated to a temperature in excess of 600° C. by maintaining a substantially higher pressure on such gas in the area where it enters such mass than the pressure in the area where the residues of such gas emerge from the mass and maintaining the mass free of substantial passages through which such gas can pass without entering the pores of the mass and being decomposed whereby the hydrocarbon gas is largely decomposed within the mass and carbon is deposited in the pores of the mass.

2. A process as specified in claim 1 in which the mass of carbonaceous material is positioned as a diaphragm in a chamber and the gas is forced through the mass with the side of the mass from which the gas emerges maintained at a higher temperature and lower pressure than that of the side of the mass with which the gas first contacts.

3. A process as specified in claim 1 in which the gas is forced through the mass by means of a tube leading into the interior of the mass.

4. A process as specified in claim 1 in which the temperature of the mass progressively increases from the side into which the gas is introduced toward the side from which the gas emerges, whereby the deposition of carbon progressively increases from the side into which the gas is introduced toward the side from which the gas emerges.

5. A process as specified in claim 1, in which the mass of hardened material is a part of a continuously formed electrode of the type in which a mass of carbonaceous material and binder are introduced into a shell, which mass progressively moves downward in the furnace and is progressively carbonized as it moves down so that the lower portion of the mass is baked and solidified while the upper part is unbaked and in which the hydrocarbon gas is forced into the baked and solidified part of the mass by a tube running through an unbaked part of the mass whereby the hydrocarbon gas is decomposed in the baked part of the electrode.

6. A process as specified in claim 4 in which the tube used for the introduction of gas into the baked part of the electrode is a contact member for supplying current to the electrode.

References Cited in the file of this patent

UNITED STATES PATENTS

| 1,470,300 | Szarvasy | Oct. 9, 1923 |
| 1,675,674 | Szarvasy | July 3, 1928 |
| 2,376,760 | Elsey | May 22, 1945 |
| 2,461,365 | Bennett et al. | Feb. 8, 1949 |
| 2,593,741 | Ferrand | Apr. 22, 1952 |
| 2,593,751 | Grolee | Apr. 22, 1952 |

UNITED STATES PATENT OFFICE

CERTIFICATE OF CORRECTION

Patent No. 2,883,708                                               April 28, 1959

Mathias Ovrom Sem

It is hereby certified that error appears in the printed specification of the above numbered patent requiring correction and that the said Letters Patent should read as corrected below.

Column 4, line 60, for the claim reference numeral "4" read -- 5 --.

Signed and sealed this 15th day of September 1959.

(SEAL)
Attest:

KARL H. AXLINE
Attesting Officer

ROBERT C. WATSON
Commissioner of Patents